United States Patent
Moradell-Casellas et al.

(10) Patent No.: US 8,943,794 B2
(45) Date of Patent: *Feb. 3, 2015

(54) LINEAR TELESCOPIC ACTUATOR FOR MOVING A FIRST AND A SECOND ELEMENT RELATIVE TO A STATIONARY ELEMENT

(75) Inventors: Pierre Moradell-Casellas, Saint Georges des Groseillers (FR); Pierre Andre Marcel Baudu, Criquetot l'Esneval (FR); Guy Bernard Vauchel, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 1044 days.

This patent is subject to a terminal disclaimer.

(21) Appl. No.: 12/681,219
(22) PCT Filed: Jul. 4, 2008
(86) PCT No.: PCT/FR2008/000960
§ 371 (c)(1), (2), (4) Date: Apr. 1, 2010
(87) PCT Pub. No.: WO2009/043981
PCT Pub. Date: Apr. 9, 2009

(65) Prior Publication Data
US 2010/0218479 A1  Sep. 2, 2010

(30) Foreign Application Priority Data
Oct. 4, 2007 (FR) ..................................... 07 06963

(51) Int. Cl.
*F02K 1/72* (2006.01)
*F16H 25/20* (2006.01)
(Continued)

(52) U.S. Cl.
CPC *F16H 25/20* (2013.01); *F02K 1/72* (2013.01); *F02K 1/763* (2013.01);
(Continued)

(58) Field of Classification Search
CPC ............... F02K 1/08; F02K 1/70; F02K 1/72; F02K 1/76; F02K 1/763; F02K 1/766; F02K 1/805
USPC .................. 60/226.2, 226.3, 771; 244/110 B; 74/89.35, 89.26; 239/265.31
See application file for complete search history.

(56) References Cited

U.S. PATENT DOCUMENTS 3,614,037 A  10/1971  Vdolek
3,829,020 A * 8/1974  Stearns ..................... 239/265.13

(Continued)

FOREIGN PATENT DOCUMENTS

FR  2895482  6/2007
FR  2902839  12/2007
(Continued)

OTHER PUBLICATIONS

International Search Report; PCT/FR2008/000960; Mar. 11, 2009.

*Primary Examiner* — Ehud Gartenberg
*Assistant Examiner* — Lorne Meade
(74) *Attorney, Agent, or Firm* — Brinks Gilson & Lione

(57) ABSTRACT

The invention relates to a linear telescopic actuator for moving a first (10b) and a second (10a) element relative to a stationary element (102). Said actuator comprises a base (101) that is to be connected to the stationary element (102) and is used as a cavity for a first rotationally locked rod (106) which can be translated by a drive shaft (104) that is to be connected to rotational driving means (107). One end (108) of said first rod is to be connected to the first element that is to be moved. The actuator is characterized in that the first rod (106) supports a second rod (117) which is aligned therewith and one end (118) of which is to be connected to the second element that is to be moved. Said second rod (117) can be rotationally locked and can be translated by a second drive shaft (112, 115) which extends through the base and is connected to rotational driving means (113, 111).

3 Claims, 4 Drawing Sheets

(51) Int. Cl.
  *F02K 1/76* (2006.01)
  *F02K 1/08* (2006.01)
  *F16H 25/22* (2006.01)

(52) U.S. Cl.
  CPC ............. F16H 25/2056 (2013.01); *F02K 1/08* (2013.01); *F16H 25/2204* (2013.01); *Y02T 50/671* (2013.01); *F05D 2220/36* (2013.01); *F05D 2250/41* (2013.01)
  USPC ...... 60/226.2; 60/771; 244/110 B; 239/265.31

(56) References Cited

U.S. PATENT DOCUMENTS

| 4,179,944 | A |  | 12/1979 | Conner |  |
|---|---|---|---|---|---|
| 4,521,707 | A | * | 6/1985 | Baker | ............................ 310/80 |
| 7,802,488 | B2 | * | 9/2010 | Bucheton et al. | ............. 74/89.23 |
| 7,883,054 | B2 | * | 2/2011 | Elliott et al. | ................. 244/99.9 |
| 8,104,261 | B2 | * | 1/2012 | Marshall et al. | ............. 60/226.2 |
| 8,713,911 | B2 | * | 5/2014 | Kopecek et al. | ............. 60/226.2 |
| 2006/0266146 | A1 | * | 11/2006 | Waide | ......................... 74/424.92 |
| 2007/0144846 | A1 | * | 6/2007 | Bucheton et al. | ............. 188/297 |
| 2009/0188233 | A1 | * | 7/2009 | Vauchel et al. | ............... 60/226.2 |
| 2010/0089029 | A1 | * | 4/2010 | Somerfield et al. | ........... 60/226.2 |
| 2010/0192715 | A1 | * | 8/2010 | Vauchel et al. | ............... 74/89.35 |
| 2010/0205931 | A1 | * | 8/2010 | Baudu et al. | ................ 60/226.2 |
| 2010/0229528 | A1 | * | 9/2010 | Ramlaoui et al. | ............. 60/226.2 |
| 2012/0067975 | A1 | * | 3/2012 | Vauchel | .................... 239/265.33 |

FOREIGN PATENT DOCUMENTS

| WO |  | 2007099333 |  | 9/2007 |  |
|---|---|---|---|---|---|
| WO | WO2008045056 | A1 | * | 4/2008 | ................ F02K 1/09 |

* cited by examiner

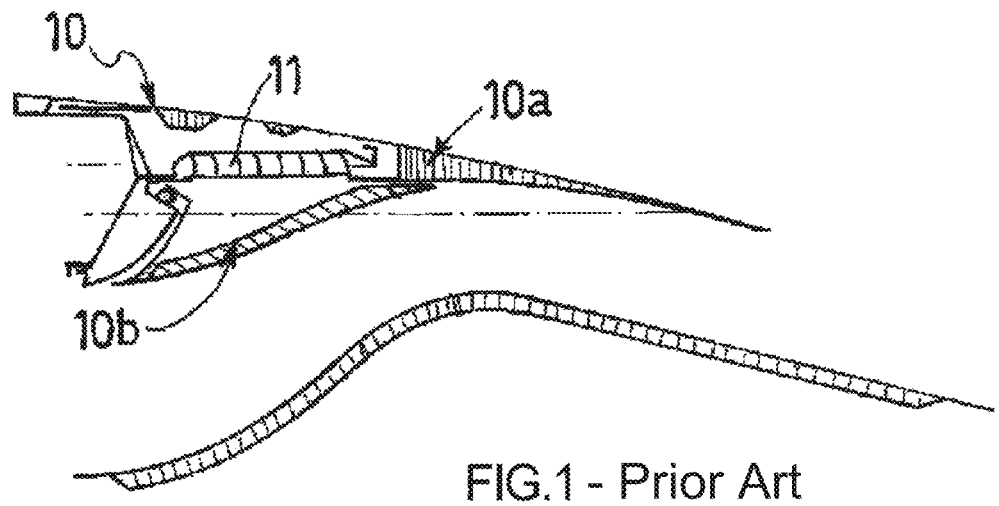
FIG.1 - Prior Art
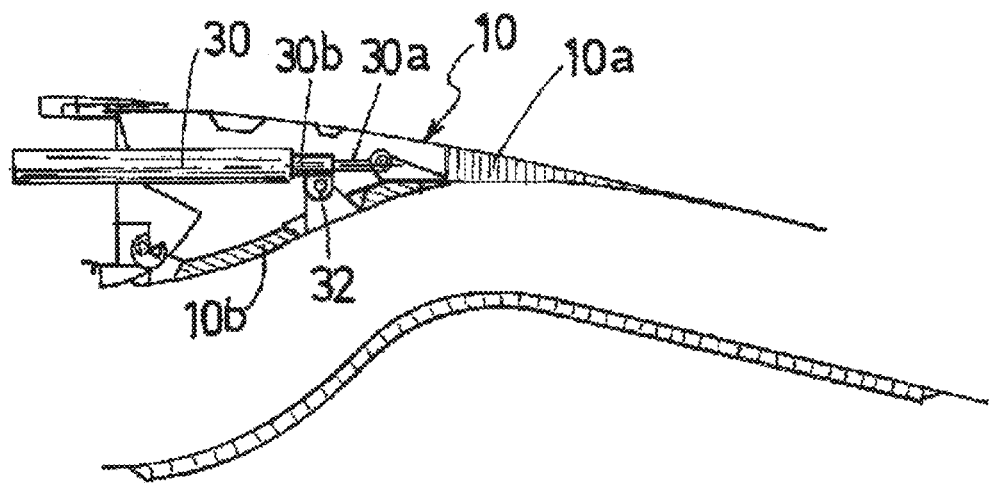
FIG.2 - Prior Art

LINEAR TELESCOPIC ACTUATOR FOR MOVING A FIRST AND A SECOND ELEMENT RELATIVE TO A STATIONARY ELEMENT

TECHNICAL FIELD

The present invention relates to a telescopic linear actuator for moving a first and a second elements relative to a stationary element, these three elements belonging in particular to a thrust reverser for a jet engine.

BACKGROUND

An airplane is moved by a number of jet engines each housed in a nacelle that also accommodates a set of ancillary actuation devices associated with its operation and handling various functions when the jet engine is operating or stopped. These ancillary actuation devices notably comprise a mechanical thrust reverser actuation system.

A nacelle generally has a tubular structure comprising an air inlet upflow of the jet engine, a mid section designed to surround a fan of the jet engine, a downflow section accommodating thrust reversal means and designed to surround the combustion chamber of the jet engine, and is generally terminated by an exhaust duct, the outlet of which is situated downflow of the jet engine.

Modern nacelles are designed to accommodate a dual-flow jet engine which uses the blades of the rotating fan to generate a flow of hot air (also called primary flow) from the combustion chamber of the jet engine, and a flow of cold air (secondary flow) which circulates outside the jet engine through an annular passage, also called artery, formed between a fairing of the jet engine and an internal wall of the nacelle. The two airflows are ejected from the jet engine through the rear of the nacelle.

The role of a thrust reverser is, when landing an airplane, to improve its braking capacity by redirecting forward at least a portion of the thrust generated by the jet engine. In this phase, the reverser obstructs the cold flow artery and directs the latter towards the front of the nacelle, thereby generating a counter-thrust that is added to the braking of the wheels of the airplane.

The means implemented to produce this reorientation of the cold flow vary according to the type of reverser. However, in all cases, the structure of a reverser comprises moving cowls that can be moved between, on the one hand, a deployed position in which they open, in the nacelle, a passage for the deflected flow, and on the other hand, a retracted position in which they close this passage. These cowls can fulfill a deflection function or simply activate other deflection means.

In the case of a reverser with grilles, also known as a cascade reverser, the reorientation of the airflow is performed by deflecting grilles, the cowl having only a simple sliding function with which to uncover or recover these grilles, the translation of the moving cowl being performed along a longitudinal axis substantially parallel to the axis of the nacelle. Complementary blocking doors, activated by the sliding of the cowling, are generally used to close the artery downflow of the grilles so as to optimize the reorientation of the cold flow.

In addition to its thrust reversal function, the sliding cowl belongs to the rear section and has a downflow side forming an exhaust duct with which to channel the exhaust of the airflows. This duct can complement a primary duct channeling the hot flow and is then called secondary duct.

It is known to address the problems of adapting the section of the duct to the various flight phases encountered, in particular the airplane's take-off and landing phases.

In order to do so, the prior art provides (see FIGS. 1 and 2 of the appended drawing) a thrust reverser comprising, on the one hand, grilles 11 for deflecting at least a portion of an airflow from the jet engine, and on the other hand, at least one cowl 10 that moves translationally in a substantially longitudinal direction of the nacelle able to switch alternately from a closed position in which it ensures the aerodynamic continuity of the nacelle and covers the deflection grilles 11, to an open position in which it opens a passage in the nacelle and uncovers the deflection grilles 11.

The moving cowl 10 comprises an external portion 10a and an internal portion 10b each fitted to move in translation and connected to a telescopic actuating cylinder 30 able to be used to translate them longitudinally (see FIG. 2). The external portion 10a (downflow side of the cowl 10) forms an exhaust duct with which to channel the exhaust of the airflows.

By dividing the moving cowl 10 into an internal portion 10b and an external portion 10a that can be moved at least partially independently of one another, it is possible to adapt the relative positions of the external portion 10a and of the internal portion 10b to the flight conditions so as to vary the section of the exhaust duct formed by the moving cowl 10 by varying the length of the internal aerodynamic line of the moving cowl 10, both when the moving cowl 10 is in the closed position and covering the deflection grilles 11, and when the moving cowl 10 is in the open position.

The telescopic cylinder 30 has a first rod 30b for moving the internal portion 10b and a second rod 30a fitted to slide in the first rod 30b to move the external portion 10a of the cowl. The internal portion 10b is attached to the first rod 30b via oblong eyelets 32 arranged either side of the rod 30b, so as to reduce the overhang of the attachment point and avoid any hyperstaticity in the alignment of the three points of attachment of the cylinder 30 to the stationary front frame and to the external 10a and internal 10b portions of the moving cowl.

This solution is satisfactory for a pneumatic or hydraulic cylinder which has sufficient available power to compensate the occurrence of spurious friction forces between the two cylinder rods 30a and 30b, due to incorrect alignment.

On the other hand, for an electric cylinder, spurious friction forces are still damaging because the need to increase the available power to overcome these frictions is then deflected in an overdimensioning of the electric motor controlling this cylinder, which affects the weight, the bulk and therefore the cost of the assembly.

Moreover, a dual-acting electric cylinder generally presents actuation difficulties. In practice, since the second rod moves relative to the base of the cylinder, it is difficult to regroup the actuation means in said base of the cylinder and the second rod must generally be fitted with its own motor, which will therefore also move.

BRIEF SUMMARY

The present invention aims to avoid these drawbacks by proposing a telescopic linear actuator which is simple, compact and lightweight and can both allow for a regrouping of the actuation means and tolerate alignment differences between its points of attachment with a stationary element and a first and a second elements to be moved independently relative to this stationary element.

To this end, the subject of the invention is a telescopic linear actuator for moving a first and a second elements relative to a stationary element, comprising a base, that is to be attached to the stationary element, and is used as a cavity for a first rotationally locked rod which can be translated via a drive shaft that is to be connected to rotational driving means, the first rod being designed to be attached by one end to the first element to be moved, characterized in that the first rod supports a second rod which is aligned therewith and intended to be attached by one end to the second element to be moved, said second rod being able to be locked rotationally and translated via a second drive shaft which extends through the base and is connected to rotational driving means.

Thus, by providing for the drive shaft of the second rod to extend through the first stage of the actuator, it is possible to regroup the actuation means of the two rods of the actuator in the base of the latter. This also makes it possible to envisage the actuation of both rods by a single motor, for example.

Advantageously, the shaft of the second rod is moreover divided into a first portion and a second portion joined by means of a kinetic joint. More advantageously, the kinetic joint is a ball joint link.

Thus, by dividing the second drive shaft into two portions connected by a ball joint link, the second rod presents a greater tolerance on the alignment with the first rod. Moreover, the ball joint link allows for the total transmission of the rotational movement of the first portion of the drive shaft to its second portion, even if not perfectly aligned.

Advantageously, the second rod is supported by a radial and axial guiding means having ball jointing properties.

Also advantageously, one end of the first rod forms a hollow shaft to guide the second rod in translation.

Preferentially, the second drive shaft is able to be driven rotationally via a transmission by rotating hollow shaft able to allow translation of the second shaft making it possible to follow a deployment or a retraction of the first rod while maintaining the rotational driving of the shaft.

Preferentially, the driving means of the transmission shafts are electric.

Again preferentially, the translation of the rods is carried out by means of a screw/nut system.

The present invention also relates to a thrust reverser for a jet engine nacelle comprising, on the one hand, means of deflecting at least a portion of an airflow from the jet engine, and on the other hand, at least one cowl that moves translationally in a direction substantially parallel to a longitudinal axis of the nacelle able to switch alternately from a closed position in which it ensures the aerodynamic continuity of the nacelle and covers the deflection means, to an open position in which it opens a passage in the nacelle and uncovers the deflection means, the moving cowl comprising at least one external portion and at least one internal portion each fitted to move translationally, characterized in that it also comprises an actuator according to the invention so as to enable their movement, independently of one another or together, in a substantially longitudinal direction of the nacelle.

BRIEF DESCRIPTION OF THE DRAWINGS

The implementation of the invention will be better understood using the detailed description which is set out hereinbelow in light of the appended drawing.

FIG. 1 (already explained) is a partial diagrammatic view in longitudinal cross section of a thrust reverser according to the prior art, equipped with a moving cowl separated into an internal portion and an external portion that can be moved relative to one another.

FIG. 2 (already explained) represents a pneumatic or hydraulic type telescopic cylinder for actuating the internal and external cowl portions according to the prior art for actuating the variable-duct-forming thrust reverser of FIG. 1.

DETAILED DESCRIPTION

Figure 3:
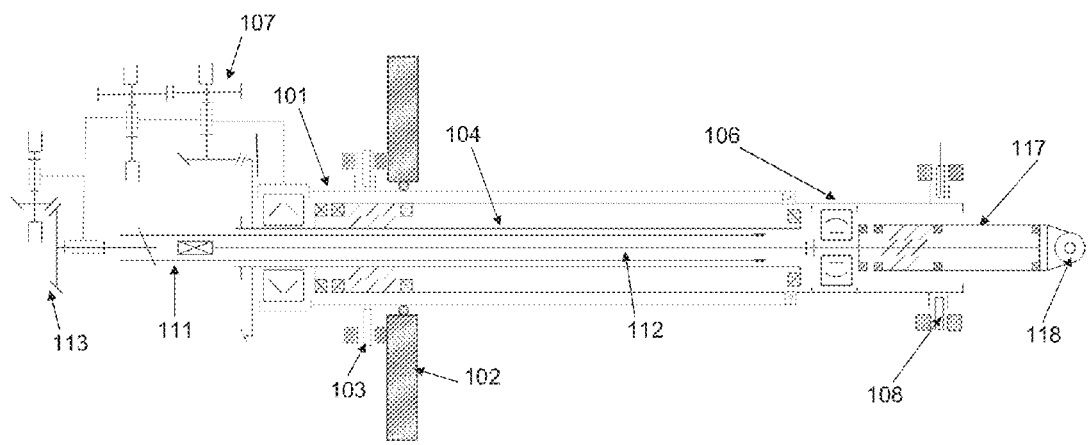
FIG. 3 diagrammatically represents an exemplary telescopic linear actuator according to the invention, applicable to a thrust reverser of the type illustrated in FIGS. 1 and 2 for moving the internal and external portions of its moving cowl.

The telescopic linear actuator illustrated in FIG. 3 is intended to make it possible to move a first element—in this case, the internal portion 10b of the cowl of FIGS. 1 and 2—and a second element—in this case, the external portion 10a of the cowl—relative to a stationary element, in this case a stationary front frame 102 of the thrust reverser.

The actuator comprises a base 101 of generally tubular shape, designed to be attached to the stationary front frame 102 by a universal joint 103.

A tubular tube 106, forming a first rod of the telescopic actuator, designed to be attached at one end, by a universal joint 108, to the internal portion 10b, is fitted to move in axial translation but locked rotationally by the universal joint 108.

A drive screw 104 of ball screw type is fitted to move rotationally in the tube in which a tapped region mates with a threaded region of this drive screw 104.

First electric motorized drive means 107 are provided to rotationally drive the drive screw 104 so as to deploy the tube 106 out of the base 101 or retract it into the latter.

A tubular slider 111 is fitted to move rotationally in the drive screw 104.

A first rod 112, linked in axial translation with the hollow shaft 106, is fitted to move in axial translation in the tubular slider 111.

Second electric motorized drive means 113 are provided to rotationally drive the slider 111.

The tube 117, including a second rod of the telescopic actuator, mobile in translation but locked rotationally, is attached by one end 118 to the external portion 10a of the cowl.

Figure 4A:
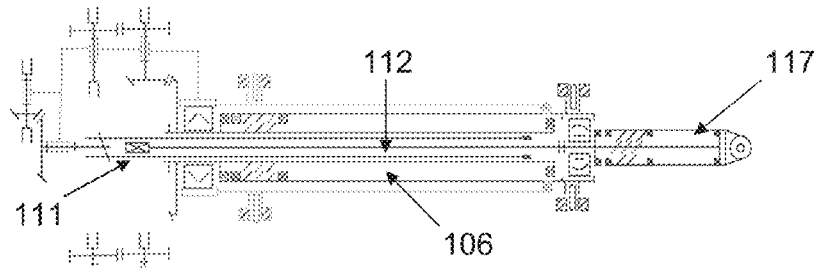
FIGS. 4a to 4e are views similar to FIG. 3 which illustrate different operating configurations of this telescopic linear actuator.
Figure 4B:
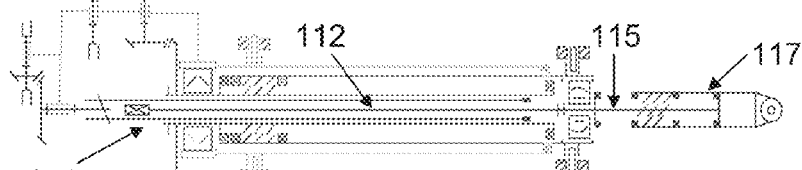
Figure 4C:
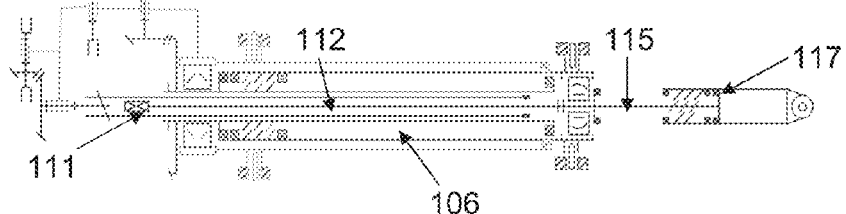

FIGS. 4a to 4c show three operating configurations of the actuator in a direct thrust situation, when the tube 106 is retracted.

FIG. 4a illustrates a configuration of the airplane, wherein the sleeve 117 is fully retracted. The duct section is then at its minimum.

In FIG. 4b, a partial deployment of the tube 117 makes it possible to reach a duct section greater than the minimum section and corresponding to a new flight phase.

In another flight phase, a complete deployment of the tube 117 makes it possible to further increase the duct section to its maximum (see FIG. 4c).

Figure 4D:
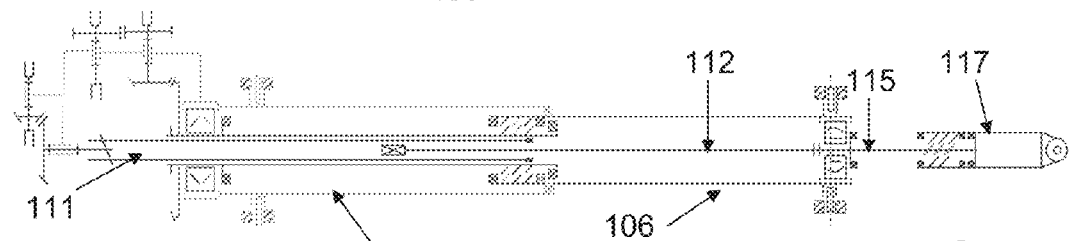
Figure 4E:
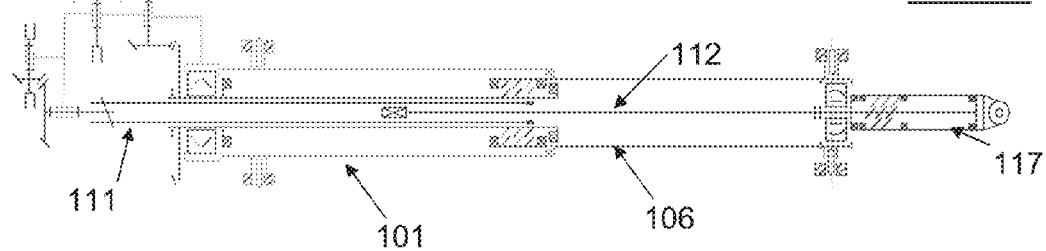

FIGS. 4d and 4e illustrate two operating configurations in a thrust reversal situation, when the hollow shaft 106 is fully deployed.

It is thus easy to synchronize the deployment or the retraction of the sleeve 117 and of the hollow shaft 106 of a number of parallel telescopic actuators such as described hereinabove, by means of hoses (not represented) or electrical control.

Figure 5:
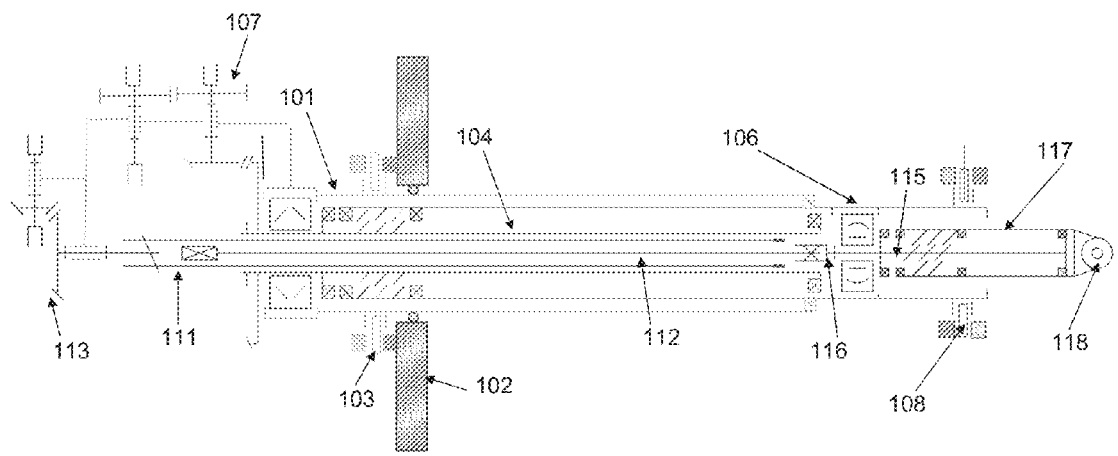
FIG. 5 is a representation of a variant embodiment of the actuator represented in FIGS. 3, 4a to 4e presenting a break in the second drive shaft and a homokinetic joint link.

FIG. 5 presents a cylinder according to the invention wherein the first rod 112 is extended, via a kinetic joint 116, by a second portion of drive shaft 115 also driven rotationally and able to drive in translation, via a nut, a tube 117. Such a refinement allows the actuator a slight angular travel between the first rod and the second rod and therefore tolerates defects in the alignment of the moving elements.

More specifically, the ball joint link means 116 comprise a spherical roller bearing arranged between the shafts 112 and 115. This ball joint link makes it possible to transmit to the second portion of the shaft 115 the rotational movement impressed on the first rod 112 by the slider 111 while allowing alignment variations between the attachment points 118, 103 and 108.

As mentioned, actuators according to the invention are particularly designed to actuate the portions of a thrust reverser cowl. Obviously, depending on the size of the cowl to be moved, it may be necessary to use one or more actuators. In the case where a number of actuators are used, the two rods can be synchronized with the other actuators by electrical synchronization between the different motors, for example, or else by using one motor for the first rods and one motor for the second rods, the power of each motor being transmitted to the rods concerned by a preferential flexible shaft-type means.

It should also be noted that an embodiment has been described wherein the shafts of the actuator are each rotated by a specific electric motor. It is obviously possible as a variant to provide for a single electric motor to actuate the two shafts either independently of one another or simultaneously.

Although the invention has been described with a particular exemplary embodiment, it is obvious that it is by no means limited and that it includes all the technical equivalents of the means described and their combinations if the latter fall within the framework of the invention.

The invention claimed is:

1. A thrust reverser for a jet engine nacelle comprising:
    means of deflecting at least a portion of an airflow from the jet engine;
    at least one cowl that moves translationally in a direction substantially parallel to a longitudinal axis of the nacelle able to switch alternately from a closed position in which the cowl ensures the aerodynamic continuity of the nacelle and covers the deflection means, to an open position in which the cowl opens a passage in the nacelle and uncovers the deflection means, the cowl comprising at least one external portion and at least one internal portion each fitted to move translationally; and
    a telescopic linear actuator for moving the internal portion and the external portion relative to a stationary element, in a substantially longitudinal direction of the nacelle, said telescopic linear actuator either moving the internal portion and the external portion together or moving the external portion independent of the internal portion and comprising:
        a base attached to the stationary element, the base forming a cavity for a first rotationally locked rod which is translated via a drive shaft that is connected to a first rotational driving means, the first rod attached by one end to the internal portion to be moved,
        wherein the first rod supports a second rod which is aligned therewith and attached by one end to the external portion to be moved, said second rod being locked rotationally and translated via a second drive shaft which extends through the base and is connected to a second rotational driving means, the second drive shaft divided into a first portion and a second portion joined by a ball joint.

2. The actuator as claimed in claim 1, wherein the second drive shaft is able to be driven rotationally via a transmission by rotating a hollow shaft able to allow translation of the second drive shaft making it possible to follow a deployment or a retraction of the first rod while maintaining the rotational driving of the second drive shaft.

3. The actuator as claimed in claim 1, wherein the translation of the rods is carried out by means of a screw/nut system.

\* \* \* \* \*